United States Patent [19]

Kies et al.

[11] Patent Number: 4,526,496
[45] Date of Patent: Jul. 2, 1985

[54] TAPERED THREAD CUTTING MACHINE

[75] Inventors: Anton M. Kies, Oisterwijk, Netherlands; Mark V. Samas, Euclid, Ohio

[73] Assignee: Erico Products, Inc., Cleveland, Ohio

[21] Appl. No.: 391,681

[22] Filed: Jun. 25, 1982

[51] Int. Cl.³ ............................................. B23G 5/08
[52] U.S. Cl. ...................................... 408/179; 10/95; 10/111; 408/153; 408/221
[58] Field of Search .............. 408/215, 221, 220, 184, 408/187, 219, 233, 216, 227, 229, 179, 153; 10/95, 111, 96 T, 120.5 R, 101

[56] References Cited

U.S. PATENT DOCUMENTS

| 1,492,426 | 4/1924 | Cashman | 408/184 |
| 1,937,418 | 11/1933 | Warren | 10/111 X |
| 2,093,506 | 9/1937 | Bartek | 408/215 |
| 2,242,954 | 5/1941 | Ingwer | 408/215 |
| 2,848,726 | 8/1958 | Reimschissel | 10/95 |
| 2,864,102 | 12/1958 | Budnick | 408/215 |
| 3,107,374 | 10/1963 | Neef | 408/233 |
| 3,580,690 | 5/1971 | McClure | 408/178 |
| 3,696,454 | 10/1972 | Youtz et al. | 10/95 |
| 3,735,436 | 5/1973 | Louys | 10/96 X |
| 4,282,618 | 8/1981 | Wagner | 10/111 |

FOREIGN PATENT DOCUMENTS

| 406892 | 3/1934 | Australia | 10/111 |
| 484297 | 8/1929 | Fed. Rep. of Germany | 10/111 |
| 474012 | 6/1947 | France | 10/111 |
| 116188 | 12/1924 | Switzerland | 10/111 |
| 289443 | 4/1953 | Switzerland | 10/111 |
| 16736 | of 1915 | United Kingdom | 10/95 |
| 800019 | 8/1958 | United Kingdom | 10/111 |
| 2011298 | 7/1979 | United Kingdom | 10/111 |
| 2025819 | 1/1980 | United Kingdom | 10/111 |

Primary Examiner—William R. Briggs
Assistant Examiner—Glenn L. Webb
Attorney, Agent, or Firm—Marky, Renner, Otto & Boisselle

[57] ABSTRACT

A tapered thread cutting machine includes a multi-part rotary machining head, one part including a through-recess and another being a separable interior wear plate. Interacting chaser holders are mounted in the recess and include angled V-shaped slots in which block type chasers may be secured between clamps and locating pins enabling the chasers to be removed and replaced without removing the holders from the recess. The holders are driven by a linear cam for opening and closing movement through a thrust block mounted on a guide rod, such thrust block being fitted in a slot in one holder but otherwise not secured thereto so that binding in the opening and closing of tool holders is minimized.

27 Claims, 7 Drawing Figures

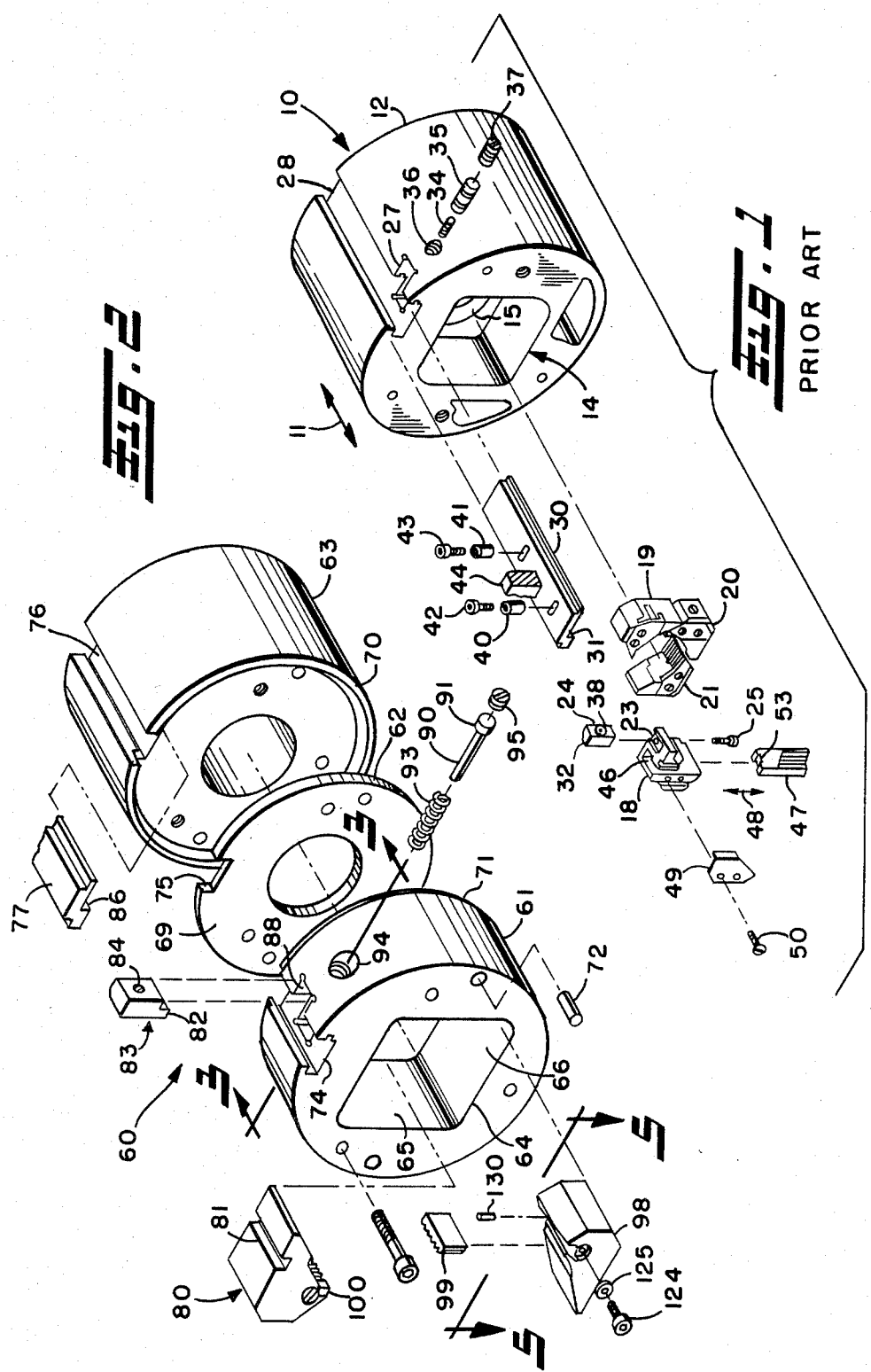

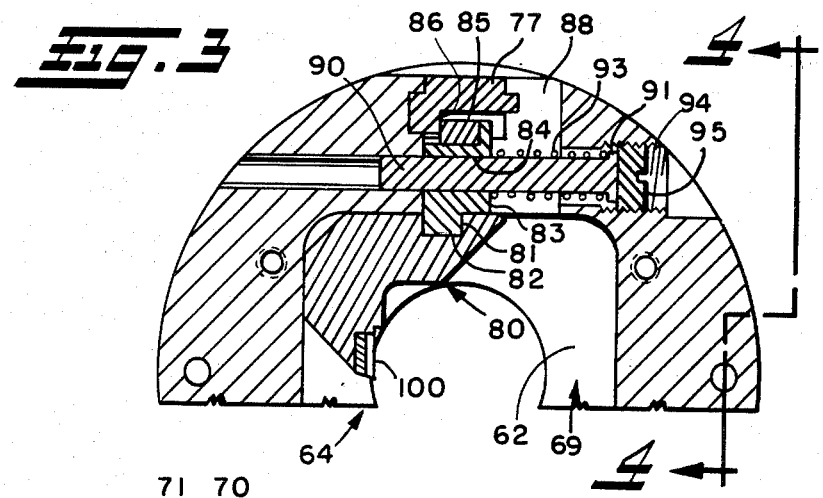
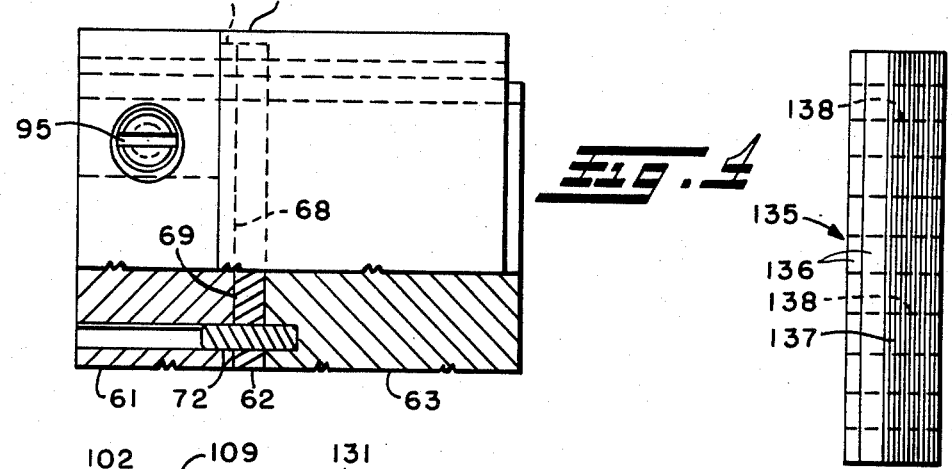
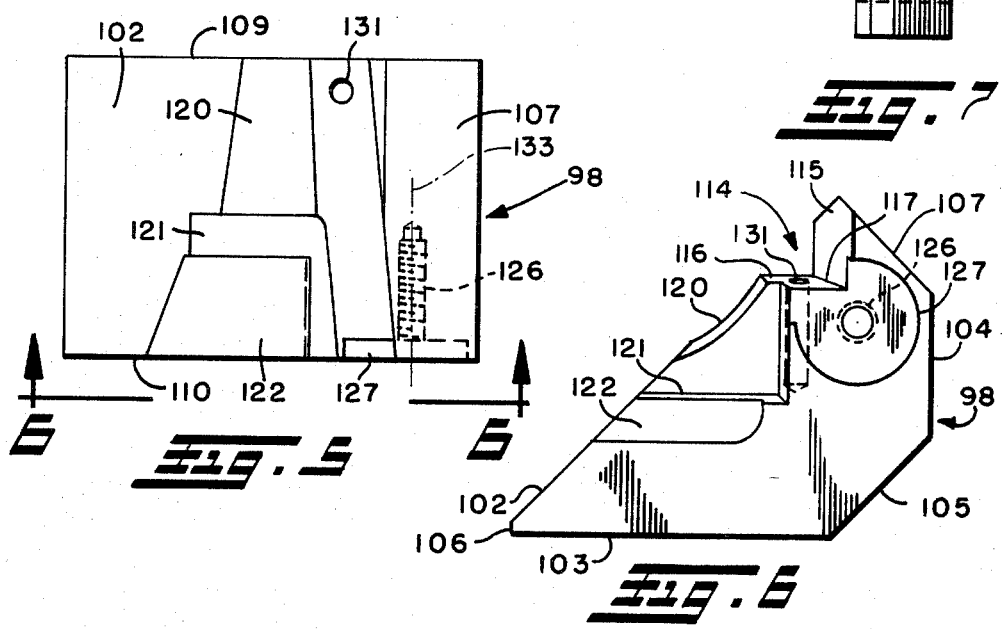
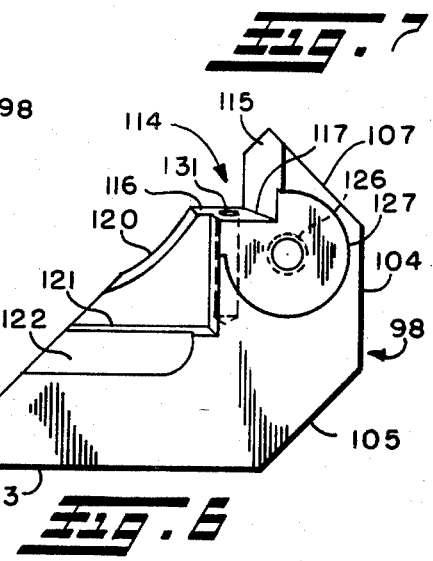

TAPERED THREAD CUTTING MACHINE

This invention relates to a tapered thread cutting machine and more particularly to certain improvements in relatively small and portable threading machines for forming external tapered thread on the ends of bar stock and the like such as concrete reinforcing bar.

BACKGROUND OF THE INVENTION

Relatively small and portable tapered thread cutting machines finding utility in the cutting of tapered threads on the ends of bar stock such as the steel used to reinforce concrete are currently being utilized by Erico Products, Inc. of Solon, Ohio and Erico Europa B.V. of Tilburg, Holland in connection with the coupling of concrete reinforcing bars known as the LENTON system. LENTON is a trademark of Erico Products, Inc. for both the machines for forming the tapered threads and for the coupling system.

In such machines a rotary machining head is employed which includes a recess in its face. Within the recess which is in the form of a regular polygon or square, tooling holders are mounted which in turn support the chasers which may be opened and closed for successive passes for the formation of the thread. A linear cam through a thrust block causes movement of one of the chaser holders which in turn because of their cooperating configuration within the recess causes movement of all.

Because of the interaction of the tooling holder with the inside surface of the recess as well as a back wear plate, the surfaces thereof must be machined and finished to a substantial degree of precision to avoid binding or chattering during the movement of the parts and to prevent excessive wear.

The rotary machining head is normally formed from a single large casting with the recess being formed therein by an end mill operation. After the recess is formed the back wear plate is normally press fit into the recess thus formed. Because of the end mill operation which necessarily entails tooling or spindle deflection, and the press fit operation, the precision of formation of the inside surfaces of the recess and the wear plate, when assembled within the recess, cannot be ensured. Furthermore, the balance of the rotary machining head which is connected to the transmission is unnessarily massive and heavy when utilizing a one-piece casting.

Further contributing to binding is the employment of the cam thrust block which is fastened to one of the holders and which is held against the linear cam by a spring which seats against the back of the thrust block. This type of design may tend to create an eccentic loading which is tranferred from the thrust block to the associated tool holder further creating binding in the movement of the tool holders which causes problems in both the opening and closing, and particularly closing of such holders.

Furthermore, prior art tool holders and the chasers supported thereby are unnessarily complex with the chasers fitting in recesses or openings in the tool holders and requiring disassembly of the tool holders from the recess to replace the chasers. Moreover, the special chasers required to fit the tool holders are of complex shapes requiring a multiplicity of machining and grinding operations making the wear replacement chasers unduly expensive to manufacture in addition to the problem of disassembly for replacement.

Reference may be had to Canadian Pat. Nos. 1,101,617 and 1,108,357 for an illustration of some types of prior art threading machines.

SUMMARY OF THE INVENTION

With the present invention a multi-part rotary machining head is provided which is formed primarily in three parts. One part includes the recess which is formed as a through-recess in that part enabling the interior wall to be formed to a considerable degree of precision. The second part is the wear plate which closes the interior end of the recess and a third part is the remaining portion of the rotary machining head connected to the transmission which may be of lighter weight material. The three parts are assembled enabling the formation of the recess and the interior wear plate in a precise relationship heretofore unobtainable. In this manner, the recess does not have to be formed by an end mill subject to tooling or spindle deflections nor does the wear plate require to be press fit into the recess.

The opening and closing of the tool holders is obtained through utilization of a cam thrust block which is mounted on one of the tool holders without a fastener and in a slot with a tight fit, but which has some play for insertion and removal. The cam thrust block is in turn mounted on a guide pin or rod which goes completely through the thrust block and through a spring. The spring is captured by a head on the rod and a removable plug in turn captures the head. This construction has been found to minimize binding or chattering in the adjustment for movement of the tool holders.

With such construction, it has also been found that a more simplified chaser design and associated tool holde may be provided. The chaser may be formed in a much more economical manner simply by cutting essentially rectangular blocks from elongated chaser stock and then surface grinding or relieving the cutting edges. Moreover, the chaser may be held in the tool holder in a relatively simple angled V-shaped slot between a stop pin and an adjustable clamp. The adjustable clamp exerts a component of force to hold the chaser against the walls or the back of the slot and against the stop pin. The construction of each tool holder is essentially the same. However, the stop of each successive tool holder may be axially offset from the stop of the next holder by the reciprocal of the number of chasers employed times the pitch of the thread being cut. In any case the chasers may much more economically be formed and may be removed and replaced without disassembly of the tool holder from the recess.

It is accordingly an important object of the present invention to provide such tapered thread cutter wherein the rotary machining head or block is formed of a multiplicity of parts, one part forming the interior walls of the recess and being open at both ends when formed to permit the interior walls to be formed to a precise planarity and relationship to each other.

Another important object is the formation of such rotary machining head wherein the wear plate is formed separately and does not require to be pressed through the recess for assembly.

Another such object is the provision of such rotary machining head wherein the balance of the head connecting the same to the transmission may be made of a lighter weight material.

Also an important object is the provision of such cutter wherein one of the holders within the recess includes a projecting cam thrust block through which a guide rod extends parallel to the movement of the holder with spring means surrounding the guide rod urging the thrust block against a control cam.

Still another important object is the provision of such thrust block which is mounted in a recess in the holder from which it projects but is otherwise unconnected to the holder.

A further important object is the provision of such cutter wherein the chaser holders include on their interior an angularly disposed recess with a stop at one end of the recess and a clamp at the other end operative hold a chaser in the recess.

It is also an object of the invention wherein the recess is a V-shape groove on the interior of the holder and wherein the clamp includes a component of force seating the chaser into the groove and against the stop.

It is also an important object of the present invention wherein the chasers can readily be manufactured in the form of rectangular blocks and secured in and removed from the holders without requiring disassembly or removal of the holders from the head recess.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is an exploded view of the rotary machining head, tool holders and chasers of a prior art LENTON machine;

FIG. 2 is a similar exploded view illustrating the improvements of the present invention;

FIG. 3 is an enlarged fragmentary transverse section of the rotary machining head through the cam thrust block and its associated guide pin or rod as taken from the line 3—3 of FIG. 2;

FIG. 4 is an fragmentary view partly in section of such head taken from the line 4—4 of FIG. 3;

FIG. 5 is an enlarged view of a tool holder taken from line 5—5 of FIG. 2;

FIG. 6 is a front elevation of the tool holder seen from the line 6—6 of FIG. 5; and FIG. 7 is a somewhat schematic plan view of the rectangular stock from which the block form chasers may be cut for finish grinding.

DESCRIPTION OF THE PRIOR ART

Referring first to FIG. 1, there is illustrated a rotary machining head block 10 which is normally formed of a single steel casting. The block is mounted in the machine with its drive for axial reciprocation in the direction of the arrow 11 with the end 12 of the block being connected to the drive transmission while the opposite end 13 is provided with a recess 14. The recess is shown in the form of a square and closed at its inner end by a wear plate 15 which is normally pressed through the opened end of the recess.

Fitted within the recess 14 are four relatively complex tooling holders seen at 18, 19, 20 and 21, such that movement of one tool holder when within the recess moves all tool holders for opening and closing movement.

One of the tool holders shown at 18 is provided with an exterior recess 23 which seats a cam thrust block 24 held thereto by fastener 25. The cam thrust block projects upwardly in the assembled condition of the tool holders through substantially radial slot 27 in the head 10 which intersects with the linear exterior axial slot 28. Mounted within the axial slot 28 is a control key or cam 30 which includes a linear cam surface 31 on the underside thereof which abuts against the upper edge 32 of the cam thrust block 24. In order to maintain the thrust block and the chaser holder against the control surface of the cam there is provided springs 34 and 35 trapped in hole 36 between the threaded plug 37 and seat 38 in the face of the cam thrust block opposite the cam engaging surface 31.

Movement of the control cam 30 is obtained by axially spaced rollers 40 and 41 held in place by shoulder bolts 42 and 43, respectively. The rollers 40 and 41 are positioned on opposite sides of an axially adjustable control ring 44 shown fragmentarily in FIG. 1.

Adjustment of the ring 44 is employed initially to contact the roller 40 to move the cam or key to a starting position which closes the holders a predetermined amount. A control setting is employed for this purpose. This setting establishes the amount of metal to be removed for the pass. When the rotary head 10 indexes forwardly or toward the viewer in the direction of the arrow 11 roller 41 engages the ring 44 initiating the uniform opening of the holders by a linear angled portion of the cam (the same as the taper being cut). In this manner, each chaser has a uniform depth of cut for each pass. At the end of the pass the cam is provided with a portion which opens the holders permitting the cam to be reset for the next pass. The number of passes employed may of course depend upon the diameter of the bar being threaded.

Also, as seen in FIG. 1, each chaser holder is provided with a major slot 46 in which the chaser 47 is inserted in the direction of the doubleended arrow 48. One edge of the slot is closed by a chaser clamping plate 49 secured by fasteners 50 to the chaser holder. The lateral edges of the clamping plate 49 are provided with flanges fitting within the flange recesses illustrated. The extent to which the chaser is inserted in the holder may be controlled by a stop pin which engages a finished flat 53 or by a threaded stud engaging a shoulder on the chaser.

In normal practice, to remove a chaser 47, the tool holders 18 through 21 must normally be removed from the recess 14. The chaser clamping plates 49 are then loosened and the chasers are then pulled from the holders in the direction of the arrow 48. Also, care must be taken to replace the chasers and holders in a precise order. It can be seen that the chasers cannot be pulled from the assembly in the manner indicated when the holders are in the recess because of the close fit and relationship therebetween.

DESCRIPTION OF THE PREFERRED EMBODIMENTS

Referring first to FIGS. 2, 3 and 4, it will be seen that the rotary machining head shown generally at 60 is formed of three separate pieces which may be termed a machining head 61, a wear plate 62 and a machining head extension 63.

The machining head 61 is provided with a square through-recess 64. Because the recess 64 is a through-recess, it need not be formed with an end mill subject to spindle or tool deflection. In this manner, the planar walls 65, 66, etc. may be formed precisely at right angles to each other and precisely in planes parallel to the axis of the rotary machining head 60. Since the tool holders are designed to slide within the precise interior walls of a true square box, the formation of the recess in this manner itself minimizes binding, chattering, or excess wear which might otherwise occur. The wear plate 62 which forms the interior wall of the recess 64 may be formed with flat opposite faces and may be secured or clamped between the head 61 and head extension 63 against a flat surface 68 forming the rear of the machining head to ensure that the interior face of the recess 69 is normal to the axis of the assembly. Press fitting such a wear plate into the open end of a recess in a one-piece machining head cannot assure the normality and planarity of the wear plate as with the present invention. The wear plate, of course, forms a wear surface for the chaser holders. The machining head extension 63 which forms the larger volume of the rotary machining head assembly may rather easily be formed from a lighter weight material such as aluminum thus significantly reducing the total mass of the rotary assembly while still obtaining the precision of the bearing and wear surfaces for the chaser holders. The plate 62 and the extension 63 are formed with aligned center holes for the stock and cutting oil.

As seen perhaps more clearly in FIG. 4, the machining head extension 63 on its forward end has a peripheral skirt 70 which encloses the periphery of the wear plate 62 and which seats against a shoulder 71 on the rear of the machining head 61. The parts of the machining head may be assembled with the assistance of one or more dowl pins 72. Each of the three major components of the assembly include aligned slots seen at 74, 75 and 76 to receive the control key or cam 77.

As in connection with the prior art there may be four chaser tool holders and respective chasers situated within the recess 64 sliding against each of the planar interior walls. The chaser tool holder 80 adjacent the cam 77 is provided with an exterior axial slot 81 in which the interior extension 82 of cam thrust block 83 is fitted. The cam thrust block 83 is provided with a transaxial through-hole 84 and optionally may include a top removable wear insert 85 designed to bear against the linear interior cam surface 86 of the control key or cam 77. When assembled with the chaser tool holder 80, the cam thrust block 83 fits upwardly through the transaxial slot 88 intersecting slot 74. The intersecting slot accomodates the cam thrust block 83 for movement transversely of the slot 74 and of course the control cam surface 86. The thrust block 83 is mounted on a hardened support pin or guide rod 90 which includes a head 91. The rod 90 fits closely through hole 84 in the cam thrust block. A spring 93 fits around the pin 90 between the thrust block and head 91 and the entire assembly is captured in hole 94 by threaded plug 95.

Referring now to FIGS. 5 and 6 in addition to FIGS. 2 and 3, it will be seen that the square recess 64 is designed to accomodate four interacting tool holders with only the two opposite tool holders being shown in FIG. 2. In FIG. 2, the opposite tool holder 98 is shown with its chaser 99 removed. The chaser 100 of the tool holder 80 is shown assembled. Since the tool holders are essentially the same, only the tool holder 98 seen in detail in FIGS. 5 and 6 will be described. The tool holder 98 is essentially in the form of a triangular block with the apex relieved as well as one corner along the base or interior face removed. Thus, the tool holder 98 includes an inner surface 102 forming the base of the triangular block and two outer faces 103 and 104 which are at right angles to each other. The face 103 of the tool holder forms a guide face guiding the tool holder along the wall 66 of the recess. The apex of the triangular block is relieved between the surfaces 103 and 104 as seen at 105 to provide clearance for the rounded corners of the recess. The corner at one end of the base or inner surface 102 may be slightly relieved as seen at 106 while the opposite end of the block at the base is provided with a guide surface 107 which is at right angles to the inner face or base 102. The guide surface 107 rides against the inner face of the adjacent tool holder.

As seen more clearly in FIG. 5, the block is provided with an inner end face 109 and an outer end face 110. Both end faces are at right angles to the other major faces. The inner end face 109 rides against the wear plate 62 and thus it is important that the wear plate be perfectly flat and that the inner walls of the recess also be perfectly flat and at right angles not only to each other but also to the wear plate. The outer end face 110 rides against the cover plate secured to the face or front of the machining head 61.

The inner face 102 of each tool holder block is provided with a V-shape groove seen generally at 114. The walls 115 and 116 of the V-shape groove may be at right angles to each other but the apex of the groove or inner corner 117 extends at an angle to the axis of the machine equal to the angle of taper of the thread to be generated on the workiece. Thus, as viewed in FIG. 6, the wall 116 of the slot extends at a slight angle downwardly while the wall 115 extends at a somewhat more severe angle outwardly. It is this slot 114 in which the chaser 99 is positioned and held. Chip clearance reliefs may be provided adjacent the slot 114 as indicated 120 and 121 with the latter clearance even being further relieved by the clearance 122.

The associated chaser 99 is in the form of a substantially rectangular block and is clamped in the slot 114 by a clamp screw 124 passing through a dished or spring washer 125 and into a tapped blind bore 126 in the face 110 of the holder. Such face is circularly relieved as indicated at 127 so that when the clamp screw is seated in clamping arrangement with the chaser its head will clear the end face 110. As seen more clearly in FIG. 6, the circular relief intersects one end of the V-shape slot 114 so that the dished washer and head bear against an end of the chaser 99. The clamp screw clamps the chaser against a stop or locating pin 130 which is positioned in blind bore 131 in the face 116 of the slot 114. It should be noted that axis 133 of the clamp screw 124 and its associated tapped bore is normal to the end faces 109 and 110 of the tool holder while the surfaces 115 and 116 are not. Thus, the clamping force on the end of the chaser exerts a component of force urging the chaser against both surfaces 115 and 116 in addition to clamping the chaser against the stop pin. The axis of the blind bore 131 is parallel to the end faces 109 and 110.

Referring now to FIG. 7, it will be seen that the chasers may readily form from tool steel bar stock shown generally at 135 which is rectangular in section. On the top surface there may be milled the leading edge chamfers seen at 136 and the thread form cutters 137. After the bar stock is properly milled it may be cut along the lines indicated at 138 to form the chaser blanks. The cutting edges may then be ground to form the necessary reliefs while the opposite edge is maintained as a right angle corner properly to seat in the slot 114 of the respective tool holder.

If the chaser bar stock is also subsequently milled or finished to provide the required leading edge chamfers the chaser for each tool holder may be formed from the same bar stock with the only difference in the holder being the spacing of the locating pin 130. In this manner, the locating pin of successive tool holders would be spaced the reciprocal of the number of tool holders times the pitch. If the locating pins for each tool holder are the same, then the chaser bar stock for the respective tool holders may be formed in essentially the same manner, but with leading edge chamfers and thread cutting sections positioned on different bar stock. In either event, the chasers may be formed of relatively simply rectangular bar stock and cut into substantially rectangular blocks for subsequent finishing for insertion in the required tool holders.

With the present invention, the multi-piece rotary machining head avoids prior art problems finishing the interior surfaces of the recess against which the tool holders must move. The same is true of the interior wear plate. Moreover, in association therewith, the mounting of the cam thrust block on the associated tool holder without fasteners in a slot with a tight fit, but which has some play for insertion and removal, in combination with the mounting of such block on a rod which goes through the block, prevents cocking of the cam thrust block and if any does occur, it is then absorbed by the non-fastened connection between the block and holder. The multi-part construction of the rotary machining head enables the surfaces against which the chaser tooling holders ride to be much more precisely formed, the balance of the rotary machining head being of a lighter weight material reducing the energy required both to drive the unit and to form it.

In addition, the chasers and tool holders of the present invention are of a much more simplified construction. The chasers may be formed economically from tool steel bar stock and may either be formed such that the tool holders and the associated clamping screws and stops are identical or such that the tool steel stock be slightly modified and the position of the stop pin against which the chaser is clamped may be modified for each tool holder by the reciprocal of the number of tool holders times the pitch. The construction and formation of the chasers and of the associated tool holders is greatly simplified permitting chaser removal and replacement without removal and disassembly of the tool holders from the recess of the head.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A tapered thread cutter for bar stock, tubing and the like comprising a rotary head block including a polygonally shaped recess supporting chaser holders on respective interior facets thereof for opening and closing movement, each chaser holder including on its interior a V-shape groove angularly disposed with respect to the rotational axis of said head block and having the walls thereof at right angles to each other, a stop at one end of said groove, and a clamp near the other end operative to hold a chaser in said groove, said chaser being an essentially rectangular block having substantially parallel faces with right angle sides in juxtaposition with the sides of said V-shape groove.

2. A thread cutter as set forth in claim 1 wherein said clamp includes a component of force seating the chaser in said groove.

3. A thread cutter as set forth in claim 1 wherein each stop is axially offset from the stop of the next chaser holder by the pitch of the thread being cut times the reciprocal of the number of chaser holders employed.

4. A thread cutter as set forth in claim 1 wherein each chaser is cut from an elongate rectangular block after thread cutting teeth are formed in one planar surface thereof.

5. A thread cutter as set forth in claim 1 wherein the apex of said groove extends at an angle to the axis of the head block equal to the angle of taper of the thread to be generated on the work piece.

6. A thread cutter as set forth in claim 1 wherein said clamp, groove and stop permit securement of said chaser in the chaser holder without having to remove the chaser holder from the recess. pg,20

7. A thread cutter for bar stock, tubing and the like comprising a rotary head block including a polygonally shaped recess in one end adapted to receive and guide a set of tool holders for opening and closing movement, said head block being substantially formed of three parts, one part having interior walls forming the recess which is open at both axial ends of said one part when formed to permit the interior walls thereof to be formed to a precise planarity and relationship to each other, a second part in the form of a removable wear plate having a planar finished surface, and a third part forming the balance of said rotary head block, said third part being made of material lighter in weight than said one part, and means for securing together said one and third parts with said removable wear plate clamped therebetween at least partially to close one end of said recess with said finished surface.

8. A thread cutter as set forth in claim 7 wherein said one part includes a peripheral shoulder while the balance includes a peripheral skirt adapted to fit within said shoulder fully enclosing said plate.

9. A thread cutter as set forth in claim 7 including a projecting cam thrust block operative to move one of said tool holders, a guide rod extending through said thrust block parallel to the movement of said one tool holder, and spring means urging said thrust block against a control cam.

10. A thread cutter as set forth in claim 4 wherein said thrust block is engaged in a recess in said one tool holder but is otherwise unconnected to said one tool holder.

11. A thread cutter as set forth in claim 9 including a shoulder or head on said rod, said spring means extending between said shoulder or head and cam thrust block.

12. A thread cutter as set forth in claim 7 including means to secure a tool in each said tool holder without requiring removal of the tool holder from the recess.

13. A thread cutter as set forth in claim 12 wherein each tool holder includes on its interior an angularly disposed V-shape groove with a clamp adjacent one end and a stop adjacent the other.

14. A thread cutter as set forth in claim 13 wherein each clamp includes a component of force seating the tool in said groove.

15. A tapered thread cutter for bar stock, tubing and the like comprising a rotary head block including a recess in one axial end adapted to receive and guide a set of tool holders for opening and closing movement, one of said holders being movable by a cam thrust block projecting therefrom, a guide rod extending through said thrust block parallel to the movement of the holder from which the thrust block projects, a control cam operative to move said thrust block, and spring means urging said thrust block slidably along said guide rod against said control cam.

16. A thread cutter as set forth in claim 15 wherein said thrust block is engaged in a recess in the holder from which it projects but is otherwise unconnected to said holder.

17. A thread cutter as set forth in claim 16 including a shoulder or head on said rod, said spring means extending between said shoulder or head and cam thrust block.

18. A tapered thread cutting machine comprising a rotary machining head including a recess having planar interior walls, each parallel to the axis of the head, a plurality of tool holders in said recess engaged with said walls and each other for opening and closing movement along said walls in response to movement of one of said holders without binding, a projecting cam thrust block operative to move said one tool holder, said thrust block being linearly slidably supported on a relatively fixed guide rod extending parallel to the movement of said one tool holder, a control cam operative to bear against said thrust block to move said thrust block along said guide rod to effect opening movement of said tool holder, and means to secure a tool in each tool holder.

19. A thread cutter as set forth in claim 18 wherein each tool holder includes on its interior an angularly disposed V-shape groove with a clamp at one end and a stop at the other.

20. A thread cutter as set forth in claim 19 wherein each clamp includes a component of force seating the tool in said groove.

21. A thread cutting machine as set forth in claim 18 including spring means urging said thrust block against said control cam.

22. A thread cutter as set forth in claim 21 wherein said thrust block is mounted in a recess in said one tool holder but is otherwise unconnected to said one tool holder.

23. A thread cutter as set forth in claim 22 including a shoulder or head on said rod, said spring extending between said shoulder or head and cam thrust block.

24. A thread cutter as set forth in claim 18 wherein said rotary machining head is formed of at least two parts, one part forming the interior walls of the recess and being open at both ends of the recess when formed to permit the interior walls to be formed to a precise planarity and relationship to each other.

25. A thread cutter as set forth in claim 24 including a removable plate secured to said one part and at least partially closing one end of said recess with a hardened finished surface.

26. A thread cutter as set forth in claim 25 wherein the balance of the rotary machining head is a third part.

27. A thread cutter as set forth in claim 26 wherein said third part is a lighter weight material.

* * * * *